US 6,527,433 B2

(12) United States Patent
Daniels, Jr.

(10) Patent No.: US 6,527,433 B2
(45) Date of Patent: Mar. 4, 2003

(54) BEVERAGE MIXER WITH PIVOTING STIR STICK AND CUP INDENTATION

(76) Inventor: Thomas E. Daniels, Jr., 9163 Canyon Gate Rd., Sandy, UT (US) 84093

( * ) Notice: Subject to any disclaimer, the term of this patent is extended or adjusted under 35 U.S.C. 154(b) by 0 days.

(21) Appl. No.: 10/012,239

(22) Filed: Nov. 13, 2001

(65) Prior Publication Data

US 2002/0080678 A1 Jun. 27, 2002

Related U.S. Application Data

(60) Provisional application No. 60/248,254, filed on Nov. 13, 2000.

(51) Int. Cl.[7] .............................. B01F 7/16; B01F 15/00
(52) U.S. Cl. ........................................ 366/205; 366/314
(58) Field of Search ................................ 366/189, 192, 366/194, 205, 314, 347, 349

(56) References Cited

U.S. PATENT DOCUMENTS

| | | | |
|---|---|---|---|
| 1,412,536 A | | 4/1922 | Mayer |
| 1,874,079 A | * | 8/1932 | Black |
| 2,066,997 A | | 1/1937 | Mueller |
| 2,070,545 A | * | 2/1937 | Gilbert |
| 2,315,018 A | * | 3/1943 | Lawrence |
| 2,785,547 A | | 3/1957 | Barros |
| 2,945,634 A | * | 7/1960 | Beck et al. |
| 3,088,345 A | | 5/1963 | Campbell |
| 3,107,711 A | | 10/1963 | Azmus |
| 3,346,029 A | | 10/1967 | Harris |
| 3,417,972 A | | 12/1968 | Vincent |
| 3,427,636 A | | 2/1969 | Seifert |
| 3,765,275 A | | 10/1973 | Johnson |
| 3,780,393 A | | 12/1973 | Gaetke |
| 3,895,548 A | | 7/1975 | Sauve |
| 3,920,224 A | * | 11/1975 | Fassauer |
| 4,030,707 A | * | 6/1977 | Moreton |
| 4,137,578 A | | 2/1979 | Felici |
| 4,201,487 A | * | 5/1980 | Backhaus |
| 4,250,771 A | | 2/1981 | Berler |
| 4,268,080 A | | 5/1981 | Lindley |
| D269,471 S | | 6/1983 | Auerbach |
| 4,395,792 A | | 8/1983 | Cosner |
| 4,397,427 A | | 8/1983 | Howard |
| 4,513,688 A | * | 4/1985 | Fassauer |
| 4,561,782 A | | 12/1985 | Jacobsen et al. |
| 5,302,021 A | | 4/1994 | Jennett et al. |
| 2001/0006486 A1 | * | 7/2001 | Ofverberg |

* cited by examiner

*Primary Examiner*—Charles E. Cooley
(74) *Attorney, Agent, or Firm*—Thorpe North & Western

(57) ABSTRACT

A beverage mixer, smoothie maker or the like includes a container with a mixing assembly disposable on a base with a motor. A lid is disposable on the container and pivotally carries a stir stick that extends through an opening in the lid. The stir stick includes a ball portion to be pivotally disposable over the opening of the lid and to cooperate with the lid to cover the opening and to allow the ball portion to pivot in the opening. A spout can be coupled to the container to dispense contents, and can align with an alignment indentation in the base. A wall with an angled upper surface can be disposed adjacent the alignment indentation to abut and guide the spout to the alignment indentation. A cup indentation can be formed in the base under the alignment indentation to receive a cup under the spout.

24 Claims, 4 Drawing Sheets

BEVERAGE MIXER WITH PIVOTING STIR STICK AND CUP INDENTATION

This application claims priority from U.S. Provisional Application No. 60/248,254, filed Nov. 13, 2000.

BACKGROUND OF THE INVENTION

1. Field of the Invention.

The present invention relates generally to a beverage mixer, smoothie maker, blender, or the like. More particularly, the present invention relates to such a beverage mixer or smoothie maker configured to facilitate making beverages, such as smoothies, and including a stirring stick with a ball-and-socket type connection with a lid, a base with an alignment notch to receive a spout of a container to align the spout for pouring, an indentation formed in the base at the spout and alignment notch to receive a glass or cup, and a circular conical container.

2. Related Art.

Frozen, frosty, or icy drinks have become increasingly popular. Such drinks include the traditional shakes, and the more recently popular smoothies. Shakes, or milk shakes, are typically formed of ice-cream and/or milk, and flavored as desired, with or without additives, such as candies, chocolates, peanut butter, etc. Milkshakes typically are available at most fast-food restaurants, such as burger chains, and can be made by special machines, or hand-made using mixers.

Smoothies tend to be more healthy, and are formed of ice, frozen yogurt, and/or sorbet, and also can include additives such as fruit, berries, fruit juice, vitamins, etc. Smoothies typically are available from specialty chains or juice bars, and can be made with commercial or restaurant-grade blenders.

Such drinks also can be made at home, using a standard kitchen blender. One disadvantage with making such drinks, or utilizing blenders, is the difficulty in operating the blender, or the inadequacy of the blender. Blenders often get clogged or otherwise stalled by the drink ingredients. It is often necessary to supplement the blending by stirring the ingredients with a spoon or spatula. The spoon or spatula can get caught in the blades of the blender. In addition, using the spoon or spatula often requires removing the lid, thus increasing the chances for the ingredients to be expelled through the top of the container.

In addition, once the blending is completed, it is often necessary to remove the container from the blender and pour the contents into a drinking cup or glass. It will be appreciated that the container has an open top that is substantially larger than a typical drinking cup or glass. Thus, it is common for the contents to pour out of the wider opening of the container, and outside the narrower cup or glass, creating a mess to clean-up, and wasting the contents.

SUMMARY OF THE INVENTION

It has been recognized that it would be advantageous to develop a smoothie maker, beverage mixer, or the like, capable of facilitating the making of smoothies, frozen drinks, and the like. In addition, it has been recognized that it would be advantageous to develop such a mixer or the like that facilitates mixing and/or stirring of the contents. In addition, it has been recognized that it would be advantageous to develop such a mixer or the like that facilitates pouring or removing the contents.

The invention provides a smoothie maker, beverage mixer or the like with a container disposable on a base. The base includes a motor turning a drive mechanism extending therefrom. The container includes a mixing assembly rotatably disposed therein and engagable by the drive mechanism when the container is disposed on the base. A lid is removably disposed on the container, and has an opening therethrough.

In accordance with a more detailed aspect of the present invention, a stir stick advantageously is configured to be carried by the lid, and to be pivotable with respect to the lid when carried thereby. The stir stick extends through the opening in the lid and into the container. The stir stick advantageously includes a ball portion configured to be pivotally disposable over the opening of the lid, and to cooperate therewith to cover the opening and to allow the ball portion to pivot in the opening. The base can have a receptacle to receive the container.

In accordance with another more detailed aspect of the present invention, a spout can be operatively coupled to the container to dispense contents thereof.

In accordance with another more detailed aspect of the present invention, an alignment indentation can be formed in the base and configured to receive the spout therein to align the spout with the base.

In accordance with another more detailed aspect of the present invention, a wall can be formed on the base proximate the alignment indentation. The wall can include an angled upper surface angled towards the alignment indentation to abut and guide the spout to the alignment indentation.

In accordance with another more detailed aspect of the present invention, a cup indentation can be formed in the base under the alignment indentation to receive a cup under the spout.

In accordance with another more detailed aspect of the present invention, the container has a circular conical shape. Thus, the container advantageously can pivot or turn in the receptacle to align the spout with the alignment indentation.

In accordance with another more detailed aspect of the present invention, a bumper formed of a flexible material can be disposed on a lower end of the stir stick and located to contact an inner surface of the container when the stir stick is pivoted. Thus, the bumper advantageously can resist marring of the container.

Additional features and advantages of the invention will be apparent from the detailed description which follows, taken in conjunction with the accompanying drawings, which together illustrate, by way of example, features of the invention.

DETAILED DESCRIPTION

Figure 1:
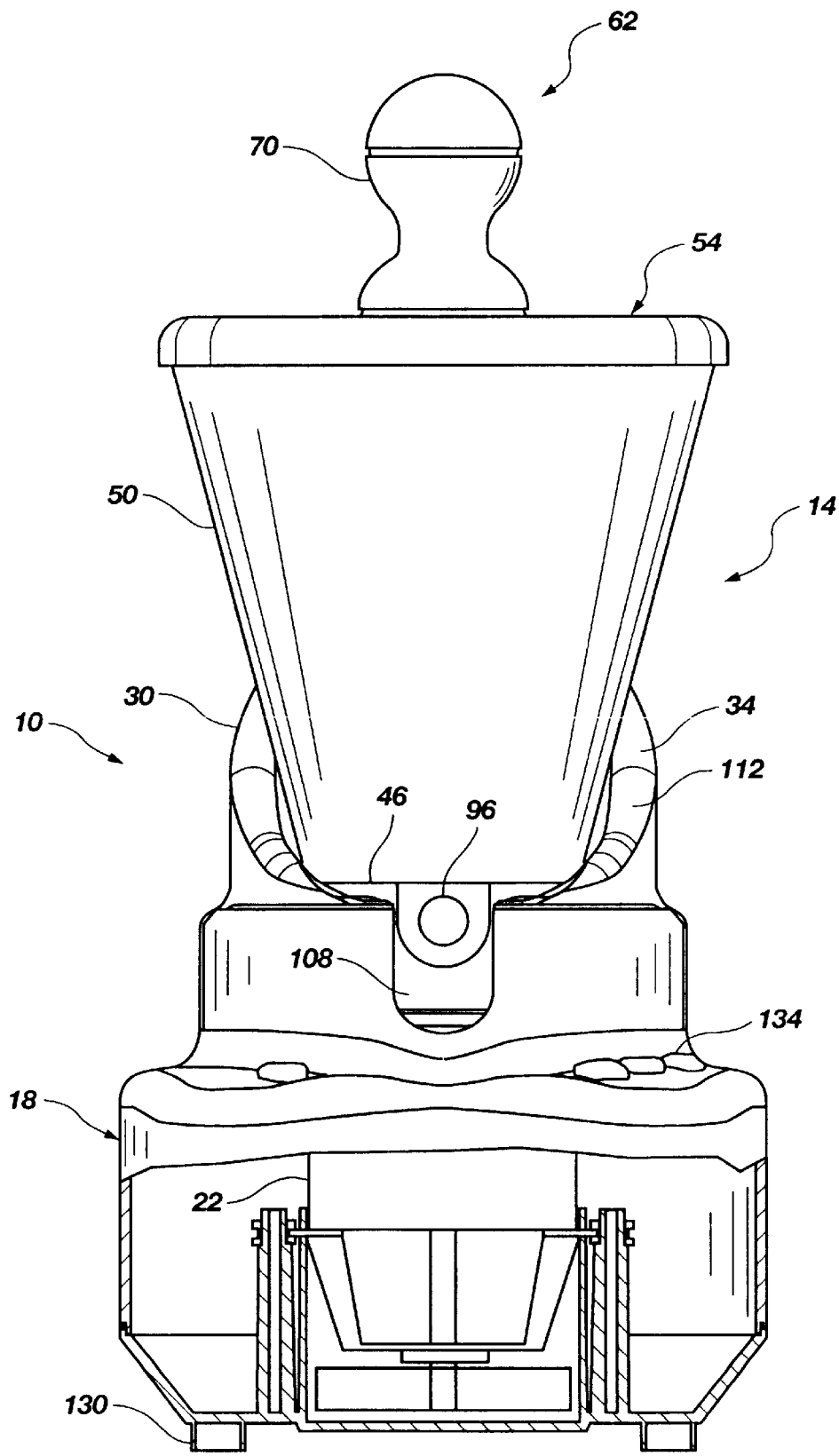
FIG. 1 is a partial broken away front view of a smoothie maker or beverage mixer in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated wherein, which would occur to one skilled in the relevant art and having possession of this disclosure, are to be considered within the scope of the invention.

Figure 2:
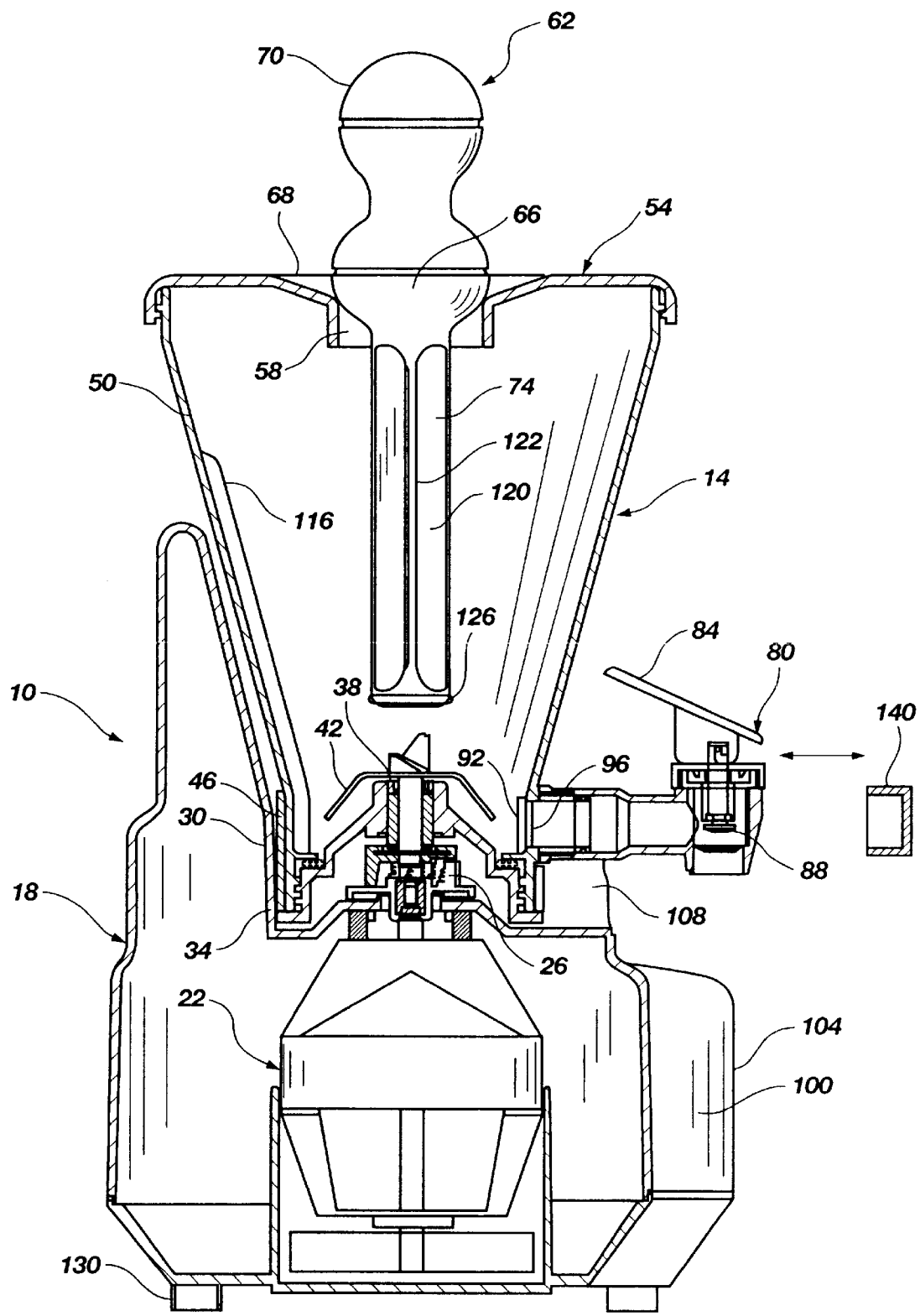
FIG. 2 is a cross sectional side view of the smoothie maker or beverage mixer of FIG. 1.
Figure 3:
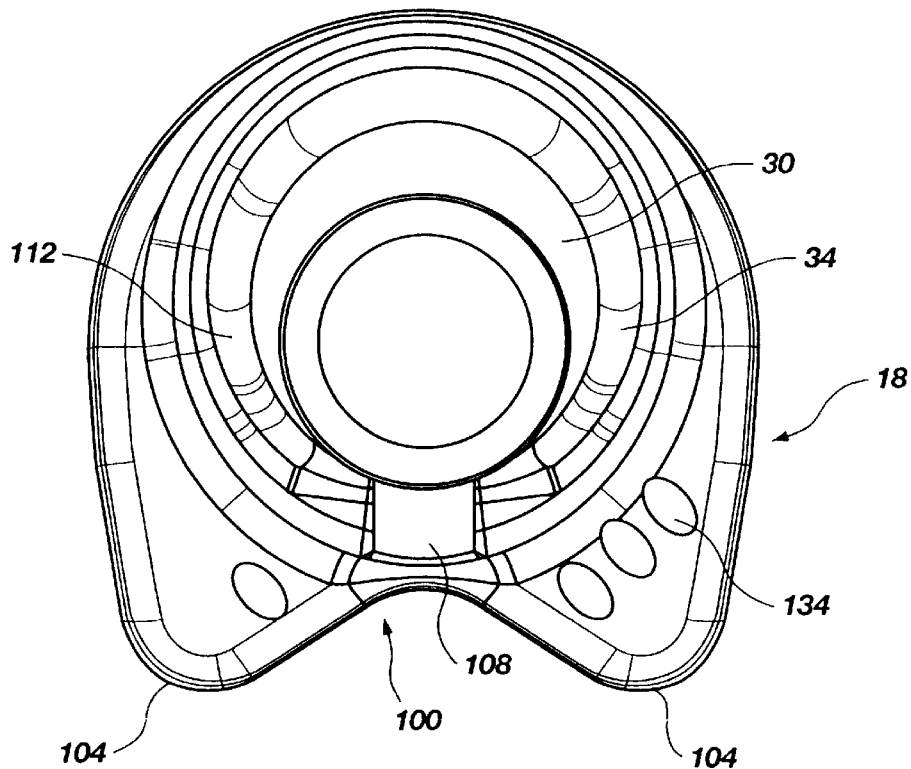
FIG. 3 is a top view of a base of the smoothie maker or beverage mixer of FIG. 1.
Figure 4:
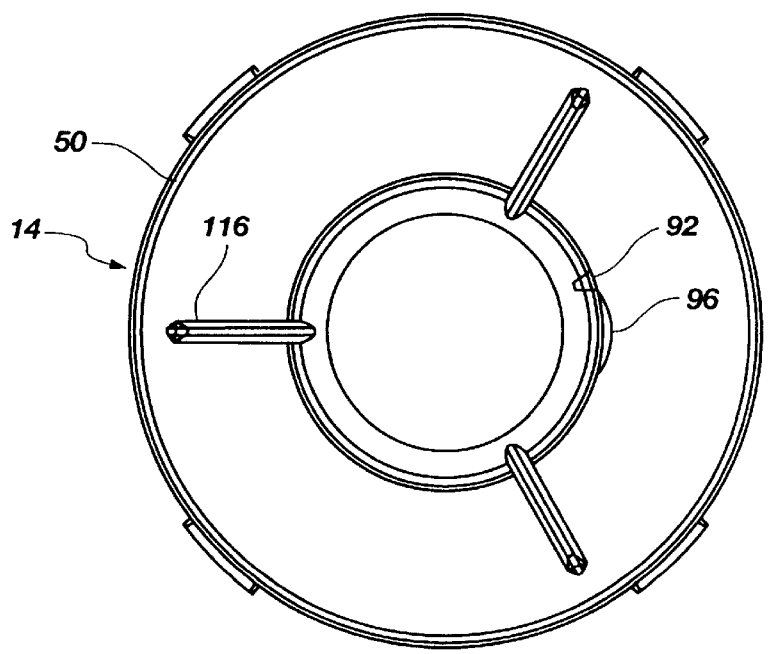
FIG. 4 is a top view of a container of the smoothie maker or beverage mixer of FIG. 1.
Figure 5:
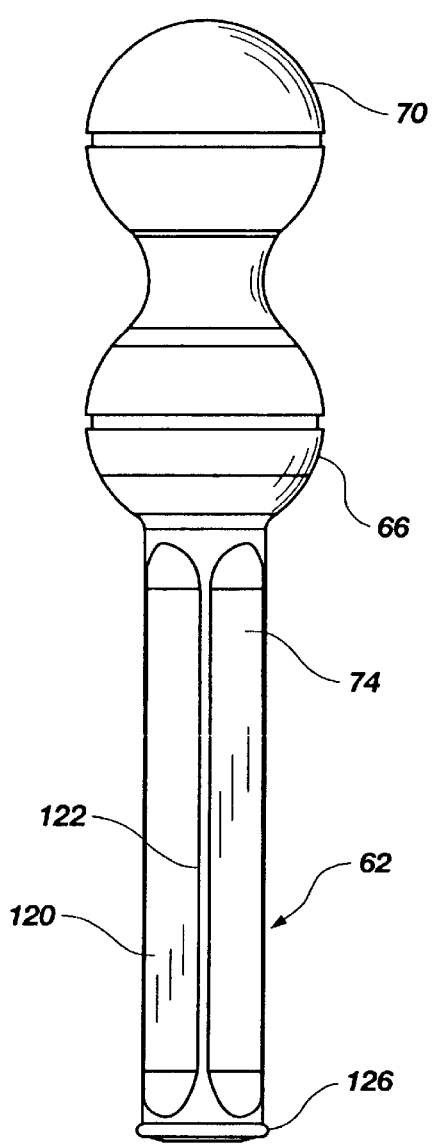
FIG. 5 is a side view of a stir stick of the smoothie maker or beverage mixer of FIG. 1.
Figure 6:
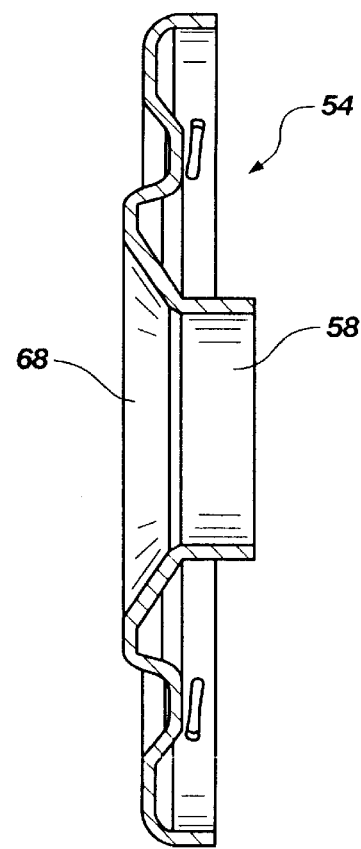
FIG. 6 is a cross sectional side view of a lid of the smoothie maker or beverage mixer of FIG. 1.
Figure 7:
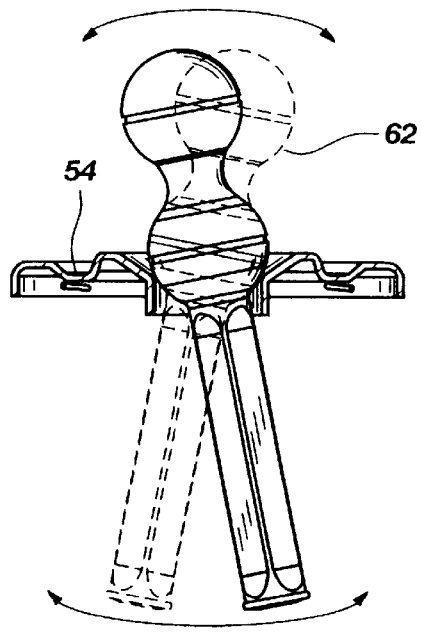
FIG. 7 is a schematic view of the stir stick pivoting with respect to the lid of the smoothie maker or beverage mixer of FIG. 1.

As illustrated in FIGS. 1–3, a smoothie maker, beverage mixer, or the like, indicated generally at 10, is shown in accordance with the present invention for making smoothies, frozen drinks, or the like. The smoothie maker or beverage mixer will be described below an illustrated with respect to a smoothie maker. It is of course understood that the present invention is equally applicable to beverage mixers and the like. Smoothies and frozen drinks are examples of a field that may benefit from use of such a smoothie maker 10. The smoothie maker 10 advantageously includes a stir stick operatively carried by a lid to facilitate stirring, a spout and cup indentation to facilitate pouring of the smoothie, and alignment structures to help align a spout of the container, as discussed in greater detail below.

The smoothie maker 10 can include a container or jar 14 removably disposable on a base or housing 18. Thus, the container 14 can be removed from the base 18 for cleaning, etc., while the base can include electrical components and the like. The base 14 includes a motor 22 capable of turning a drive mechanism 26 that extends from the base 18. In one aspect, the drive mechanism 26 can be located at a top of the base 18, and the container 14 is disposable on the top of the base 18, and on top of the drive mechanism 26. Thus, the container 14 can utilize gravity to help maintain the container 14 on the base 18.

A receptacle or socket 30 can be formed with the base 18 and configured to receive the container 22, or a portion thereof. The receptacle 30 can be formed on the top of the base 18 with the drive mechanism 26 disposed within the receptacle 30. The receptacle 30 can include a perimeter wall 34 to receive the container 22, or portion thereof, therein. In one aspect, the receptacle 30 can be circular, and the perimeter wall 34 can be an annular wall.

The container 14 includes a mixing assembly 38 that can include a plurality of blades 42 rotatably disposed in the container 14. The mixing assembly 38 can be engaged by the drive mechanism 26 of the base 18 when the container 14 is disposed on the base 18, or in the receptacle 30. For example, the drive mechanism 26 and the mixing assembly 38 can include mating or matching couplings, such as one or more intermeshing protrusions and indentations, so that the rotation and force of the motor 22 in the base can be transferred to the mixing assembly 38 or blades 42 in the container 14. A lower portion or bottom of the container 14 can be configured to mate or match the receptacle 30 to help maintain the container 14 on the base 18, and to properly align the mixing assembly 38 of the container 14 with the drive mechanism 26 of the base 18, or couplings thereof. Thus, the lower portion or bottom of the container 14 can be circular to match the circular shape of the receptacle 30.

The container 14 can include a base or bottom portion 46 secured to a container portion 50. The base or bottom portion 46 can be circular to match the circular shape of the receptacle 30 as described above. The base portion 46 of the container 14 can be removably secured to the container portion 50, such as by screw threads, so that the container 14 can be disassembled for cleaning. In addition, the mixing assembly 38 can be secured to the container 14 by the base portion 46, or between the base portion 46 and the container portion 50. Thus, the mixing assembly 38 also can be removably secured to the container. The mixing assembly 38 can cooperate with the base portion 46 to engage the drive mechanism 26 of the base 18.

The container portion 50 can be a hollow shell with an annular wall to receive ingredients therein. In one aspect, the container 14 or container portion 50 can be an inverted, circular, frusto-conical shell. The purpose of the circular shape is described in greater detail below. In addition, the container portion 50 or shell or wall can be transparent, or formed of a transparent material, to enable viewing the contents of the container 14. A top of the shell or container 14 can be open to receive ingredients therethrough, while the bottom of the shell can be open to receive the mixing assembly 38 so that the mixing assembly 38 or blades 42 can operatively engage the contents of the container 14. The base portion 46 can be configured as a cup to receive a bottom portion of the container portion 50 or shell therein, and to enclose the bottom of the container 14. Thus, the base portion 46 and container portion 50 form the container 14.

A lid 54 can be removably disposed on the container 14 to resist expulsion of the contents or the ingredients of the container during mixing, or while the blades 42 are rotating. The lid 54 can include an opening 58 therethrough. Thus, ingredients can be introduced into the container 14 either by removing the lid 54 and inserting the ingredients into the container 14, or by inserting the ingredients through the opening 58 in the lid.

A stir stick 62 advantageously is configured to be carried by the lid 54, and to cooperate with the lid 54, to allow the contents of the container 14 to be stirred with the stir stick 62, and/or to cover the opening 58 of the lid 54. The stir stick 62 can be extendable through the opening 58 in the lid 54 and into the container 14. In addition, the stir stick 62 can be pivotable with respect to the lid 54.

The stir stick 62 advantageously includes a bulbous or ball portion 66 pivotally disposable over the opening 58 of the lid 54. The lid 54 can include a conical or rounded indentation or socket 68 surrounding the opening 58 to receive the ball portion 66 of the stir stick 62. The ball portion 66 cooperates with the lid 54 to cover the opening 58 and to allow the ball portion 66 to pivot in the opening 58. Thus, the ball portion 66 of the stir stick 62 and the opening 58 in the lid 54 form a ball-and-socket type coupling. The ball portion 66 has a bulbous, spherical, semi-spherical, or rounded shape that slides smoothly in the opening 58 of the lid 54 as the stir stick 62 pivots in the container 14. In addition, the ball portion 66 limits the distance the stir stick 62 can be inserted into the container 14 to resist contact between the stir stick 62 and the mixing assembly 38 or blades 42. The lid 54 or opening 58 can be configured to match or mate with the ball portion 66.

The stir stick 62 also can include a handle portion 70 and a stir portion 74. The handle portion 70 is configured to extend above the lid 54, while the stir portion 74 is configured to extend below the lid 54, and into the container 14. The handle portion 70 can be configured to facilitate grasping. In one aspect, the handle portion 70 can have a bulbous, circular, or spherical shape that can be grasped by a user's hand.

The stir portion 74 can have a length that extends to a location above the mixing assembly 38 or blades 42, but without contacting the blades 42, to prevent damage. The length of the stir portion 74 and the ball portion 66 captured in the opening 58 of the lid 58 advantageously prevent the stir stick from reaching and interfering with the mixing assembly 38.

A spigot or spout 80 advantageously is operatively coupled to the container 14 at or near the bottom of the container 14. The spout 80 advantageously allows the contents of the container 14 to be dispensed through the spout 80, as opposed to being poured through the top of the container. The spout 80 can include any type of valve and/or actuation system. For example, the spout 80 can include a handle 84 for displacing a plunger type valve 88 within the spout 80. Thus, by lifting/depressing/turning the handle 84, the valve 88 is displaced allowing the contents of the container 14 to flow through the spout 80. The fluid pressure of the contents in the container 14 tends to force the contents out through the spout 80.

As the contents of the container 14 are dispensed, the fluid pressure decreases. Thus, it can be difficult to dispense the remaining contents of the container 14. A protrusion or wall 92 can be located adjacent an opening 96 in the container 14 for the spout 80. The protrusion or wall 92 can extend into the interior from the wall of the container 14. The protrusion or wall 92 can be located on the downstream side of the opening 96, or opposite the rotational direction of the blades 42, for directing the flow of the contents towards the opening 96, and thus out of the spout 80. Thus, the mixing assembly 38 or blades 42 can be actuated to create a centrifugal (centripetal) flow which forces the contents outwardly against the inner surface of the container 14, while the protrusion or wall 92 interrupts or blocks the flow, and directs the contents out of the opening 96 to the spout 80. Thus, a glass or cup may be disposed adjacent the base 18 and under the spout 80 to receive the contents of the container 14 when the spout 80 is operated.

The container 14 and base 18 advantageously are configured to facilitate dispensing the contents of the container 14 through the spout 80. A cup indentation 100 with protrusions 104 on either side can be formed in the base 14 to properly position a cup or glass under the spout 80 to resist spills. In addition, an alignment indentation 108 can be formed in the base 14 or the receptacle 30 to receive the spout 80 therein. The alignment indentation 108 can be located above the cup indentation 104 so that the spout 80 is positioned over the cup indentation 104 of the base 18 when the container 14 is disposed in the receptacle 30 on the base 18. The location of the spout 80 at the bottom of the container 14, and the wall 34 of the receptacle 30, prevent the container 14 from being properly disposed in the receptacle 30 and on the base 18, unless the spout 80 is aligned with the alignment indentation 108. Thus, as the container 14 is received in the receptacle 30 of the base 18, the spout 80 is received in the alignment indentation 108. In addition, the alignment indentation 108 and spout 80 can act to prevent the container 14 from rotating on the base 18 when the motor is operated.

The wall 34 of the receptacle 30 advantageously can include an angled upper surface 112 angled towards the alignment indentation 108. Thus, the wall 34 can have a smaller height proximate the alignment indentation 108, and a larger height distal from the alignment indention. In addition, the wall 34 can be arcuate or circular to surround the receptacle 30. Thus, if the container 14 is places on the base 18 or in the receptacle 30 without being properly aligned, the spout 80 abuts the upper surface 112 of the wall 34, and is guided to the alignment indentation 108 by the angle of the wall 34. In one aspect, the wall 34 can extend entirely around the receptacle 30 in a continuous arc, with the most distal portion of the wall 34 having the greatest height, and decreasing in height towards the alignment indentation 108. The circular or arcuate shape of the wall 34 facilitates rotation of the container 14 in the receptacle 30 until the spout 80 is aligned with the alignment indentation 108.

As stated above, the container 14 can be circular to facilitate fitting within, and turning within, the circular wall 34 of the receptacle 30. The container wall or shell can have an inverted, circular, frusto-conical shape. In addition, it has been found that the circular, conical shape of the container 14 can impart a fast, vortex action to the contents or ingredients in the container 14 when the mixing assembly or blades are operated. It is believed that the circular conical shape of the container 14 contributes to the vortex action of the contents by having a natural shape of a whirlpool or vortex.

It has been found that the vortex action of the circular conical shape of the container, in conjunction with selective pivoting of the stir stick 62, can assist in mixing the contents. Rotating, or pivoting the stir stick 62, tends to disrupt the vortex and direct or drive ingredients downwardly. Thus, the circular conical shape of the container 14 facilitates a circular vortex flow, while the stir stick 62 facilitates directing ingredients vertically, and driving ingredients towards the blades.

In addition, protrusions 116 can extend inwardly from the wall of the container 14 to facilitate mixing or blending. The protrusions 116 cause a more turbulent flow as the contents or ingredients flow past the protrusions 116.

In addition, the stirring portion 74 of the stir stick 62 can be configured to facilitate stirring or mixing. The stirring portion 74 itself can be selectively manipulated or pivoted by the user to stir or mix the ingredients. In one aspect, the stirring portion 74 can include broad or wide fins 120, similar to a spatula, to push or move the ingredients as the stirring portion 74 is pivoted. In another aspect, the stirring portion 74 can include at least two fins 120 and 122 extending therefrom in transverse directions to a longitudinal axis of the stirring portion 74, and in transverse directions to one another, to facilitate stirring and mixing. Thus, the stirring portion 74 can have a cross section in the shape of a cross ("x") or plus ("+") shape. Therefore, as the stirring portion 74 is pivoted in a circular direction, a broad surface of at least one of the fins 120 or 122 will push against the ingredients.

In addition, the stir stick 62 or stirring portion 74 can merely extend into the container 14. The fins 120 and 122 can extend into the flow of the ingredients and cause more turbulent mixing, much like the protrusions 116 on the inner surface of the container 14.

A bumper 126 advantageously can be located on a lower end of the stir stick 62 to contact the inner surface or wall of the container 14 as the stir stick is pivoted. The bumper 126 can be formed of a flexible material to resist marring the container. It will be appreciated that repeated contact between two objects, such as the stir stick and container, can result in marring, and that can be unsightly, especially with a transparent or translucent container. Thus, as the user stirs the ingredients in the container 14 with the stir stick 62, the lower end may often strike the wall of the container 14, but the bumper 126 will resist marring.

In one aspect, the bumper 126 can be an o-ring. An annular indentation or groove can be formed in the lower end of the stir stick 62 or stirring portion 74 to receive the o-ring or bumper 126. The o-ring or bumper 126 can surround the lower end of the stirring portion 74.

As is known in the art, the base 18 can be configured to be disposed on a support surface, such as a counter or work surface. Feet or tabs 130 can be located on the bottom of the base 18 so that base 18 rests on the feet or tabs 130. The feet or tabs 130 can be formed of a high friction material, such as rubber or the like, to resist sliding or movement of the base during operation. In one aspect, the feet or tabs 130 can be located inwardly from a perimeter of the base 18, or with the alignment protrusions 108 extending outwardly past the feet or tabs 130. Thus, the base 18 can be positioned on the edge of the counter or work surface, so that the spout 80 and alignment protrusions 104 extend past the edge, so that a larger glass can be positioned under the spout 80 without interference from the counter or work surface.

In another aspect, the alignment protrusions 104 can extend outwardly from the base 14 to a location substantially at or near a vertical location of the spout 80, and the feet 130 can be located at the outer perimeter of the protrusions 104. Thus, the feet 130 and protrusions 104 can resist tipping of the smoothie maker 10 due to force, such as a downward force, exerted on the handle or the spout 80.

Controls or a control panel with buttons 134 for controlling the operation of the motor 18 or smoothie maker 10 also can be disposed on the base 18. As is known in the art, the controls or buttons 134 can be electrically coupled to the motor to control its operation. The buttons 134 can include an on/off button, speed control, etc.

In operation the lid 54 can be removed from the container 14 and ingredients for a smoothie or other frozen drink placed within the container 14. Alternatively, the lid 54 can remain on the container 14, and the ingredients can be inserted through the opening 58 of the lid 54, with the stir stick 90 removed therefrom. The container 14 may be disposed on the base 18 before the ingredients are placed in the container 14, or after. The mixing assembly 42 may be actuated, by operating the motor 22, in order to blend the ingredients within the container 14. In addition, a user may grasp the handle portion 78 of the stir stick 62, and pivot or rotate the stir stick, such that the stirring portion 74 of the stir stick facilitates moving and mixing the ingredients in the container 14. After the ingredients or contents are blended, a glass or cup may be placed under the spout 80, and in the cup or glass indentation 100. The handle of the spout 80 can be operated to dispense the contents from the container 14, through the spout 80, and into the cup or glass.

In accordance with another aspect of the present invention, the spout 80 can be a removable spout, or can be removably attached to the container 14 or bottom portion 46. For example, the spout 80 can threadably engage the container 14. A seal can be positioned between the spout 80 and the container 14 to resist leaking. A cap 140 can be removably attached to the container 14 or bottom portion 46 thereof to cover the opening 96 in the container 14 when the spout 80 is removed. Similarly, the cap 140 can threadably engage the container 14, and a seal can be positioned between the cap 140 and container 14 to resist leaking. Thus, the smoothie maker or beverage mixer 10 can be used in more of a food processing manner, or with more solid ingredients, such as nuts, with the spout 80 removed and the opening 96 covered by the cap 140. It will be appreciated that removing the spout 80 prevents the more solid ingredients from clogging the spout 80.

It is to be understood that the above-described arrangements are only illustrative of the application for the principles of the present invention. Numerous modifications and alternative arrangements can be devised without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment (s) of the invention, it will be apparent to those of ordinary skill in the art that numerous modifications can be made without departing from the principles and concepts of the invention as set forth in the claims.

What is claimed is:

1. A beverage mixer, comprising:
   a) a base including a motor tuning a drive mechanism extending therefrom;
   b) a container, disposable on the base, including a mixing assembly rotatably disposed therein and engagable by the drive mechanism when the container is disposed on the base;
   c) a lid, removably disposed on the container, having an opening;
   d) a stir stick, configured to be carried by the lid, and extendable through the opening in the lid and into the container, and to be pivotable with respect to the lid when carried thereby; and
   e) the stir stick including a substantially spherical ball portion pivotally disposable over the opening of the lid to cooperate therewith to cover the opening and to allow the ball portion to pivot in the opening.

2. A beverage mixer in accordance with claim 1, further comprising:
   a) a spout, operatively coupled to the container, to dispense contents thereof; and
   b) an alignment indentation, formed in the base, configured to receive the spout therein to align the spout with the base.

3. A beverage mixer in accordance with claim 2, further comprising:
   a) a wall, formed on the base proximate the alignment indentation, having an angled upper surface angled towards the alignment indentation to abut and guide the spout to the alignment indentation.

4. A beverage mixer in accordance with claim 2, further comprising:
   a) a cup indentation, formed in the base under the alignment indentation, configured to receive a cup under the spout.

5. A beverage mixer in accordance with claim 1, wherein the container has a circular conical shape.

6. A beverage mixer in accordance with claim 1, further comprising:
   a) a bumper formed of a flexible material, disposed on a lower end of the stir stick, and located to contact an inner surface of the container when the stir stick is pivoted.

7. A beverage mixer in accordance with claim 1, further comprising:
   a) at least two fins, extending outwardly from the stir stick in transverse directions.

8. A beverage mixer in accordance with claim 1, further comprising:
   a) a ridge, protruding from an inner surface of the container proximate an opening through the container to the spout, configured to guide contents of the container through the opening.

9. A beverage mixer in accordance with claim 1, wherein the ball portion of the stir stick is slidable in the opening of the lid as the stir stick pivots.

10. A beverage mixer in accordance with claim 1, further comprising:
an indentation, surrounding the opening of the lid, and receiving the ball portion of the stir stick.

11. A beverage mixer in accordance with claim 10, wherein the indentation is rounded to match the ball portion of the stir stick; and wherein the ball portion of the stir stick and the indentation of the lid form a ball-and-socket type coupling.

12. A beverage mixer, comprising:
a) a base including a motor turning a drive mechanism extending therefrom, and having a receptacle;
b) a container, removably disposable on the receptacle of the base, including a mixing assembly rotatably disposed therein and engagable by the drive mechanism when the container is disposed on the receptacle;
c) a spout, operatively coupled to the container, to dispense contents thereof; and
d) an alignment indentation, formed in the receptacle of the base, configured to receive the spout therein to align the spout with the base.

13. A beverage mixer in accordance with claim 12, further comprising:
a) a wall, formed about the receptacle, having an angled upper surface angled towards the alignment indentation to abut and guide the spout to the alignment indentation.

14. A beverage mixer in accordance with claim 12, further comprising:
a) a cup indentation, formed in the base under the alignment indentation, configured to receive a cup under the spout.

15. A beverage mixer in accordance with claim 12, further comprising:
a) a lid, removably disposed on the container, having an opening;
b) a stir stick, carried by the lid, and extendable through the opening in the lid and into the container, and pivotable with respect to the lid when carried thereby; and
c) the stir stick including a ball portion configured to be pivotally disposable over the opening of the lid and to cooperate therewith to cover the opening and to allow the ball portion to pivot in the opening.

16. A beverages mixer, comprising:
a) a base including a motor turning a drive mechanism extending therefrom;
b) a container, removably disposable on the base, including a mixing assembly rotatably disposed therein and engagable by the drive mechanism when the container is disposed on the base,
c) a spout, operatively coupled to the container, to dispense contents thereof;
d) a cup indentation, formed in the base at a position under the spout when the container is disposed on the base, configured to receive a cup under the spout; and
e) an alignment indentation, formed on the base, configured to receive the spout therein to align the spout with the cup indentation of the base.

17. A beverage mixer in accordance with claim 16, further comprising:
a) a wall, formed on the base proximal the alignment indentation, having an angled upper surface angled towards the alignment indentation to abut and guide the spout to the alignment indentation.

18. A beverage mixer in accordance with claim 16, further comprising:
a) a lid, removably disposed on the container, having an opening;
b) a stir stick, carried by the lid, and extendable through the opening in the lid and into the container, and pivotable with respect to the lid when carried thereby; and
c) the stir stick including a ball portion pivotally disposable over the opening of the lid to cooperate therewith to cover the opening and to allow the ball portion to pivot in the opening.

19. A beverage mixer in accordance with claim 16, further comprising:
a) a valve, disposed on the spout, configured to allow contents of the container to flow through the spout; and
b) a handle, disposed on the valve, to actuate the valve.

20. A beverage mixer, comprising:
a) a base including a motor turning a drive mechanism extending therefrom, and having a receptacle;
b) a container, removably disposed on the base and received in the receptacle, including a mixing assembly rotatably disposed therein and engagable by the drive mechanism when the container is disposed on the base;
c) a lid, removably disposed on the container, having an opening;
d) a stir stick, configured to be carried by the lid, and extendable through the opening in the lid and into the container, and to be pivotable with respect to the lid when carried thereby;
e) the stir stick including a ball portion configured to be pivotally disposable over the opening of the lid and to cooperate therewith to cover the opening and to allow the ball portion to pivot in the opening;
f) a spout, operatively coupled to the container, to dispense contents thereof;
g) an alignment indentation, formed in the receptacle of the base, configured to receive the spout therein to align the spout with the base;
h) a wall, formed about the receptacle, having an angled upper surface angled towards the alignment indentation to abut and guide the spout to the alignment indentation; and
i) a cup indentation, formed in the base under the alignment indentation, configured to receive a cup under the spout.

21. A beverage mixer in accordance with claim 20, further comprising:
a) a bumper formed of a flexible material, disposed on a lower end of the stir stick, and located to contact an inner surface of the container when the stir stick is pivoted.

22. A beverage mixer in accordance with claim 20, further comprising:
a) at least two fins, extending outwardly from the stir stick in transverse directions.

23. A beverage mixer in accordance with claim 20, further comprising:
a) a ridge, protruding from an inner surface of the container proximate an opening through the container to the spout, configured to guide contents of the container through the opening.

24. A beverage mixer, comprising:
a) a base including a motor turning a drive mechanism extending therefrom;
b) a container, removably disposable on the base, including a mixing assembly rotatably disposed therein and engagable by the drive mechanism when the container is disposed on the base;
c) a spout, operatively coupled to the container, configured to dispense contents of the container;
d) a valve, disposed on the spout, configured to allow the contents to flow through the spout;
e) a cup indentation, formed in the base at a position under the spout when the container is disposed on the base, configured to receive a cup under the spout;
f) a lid, removably disposed on the container, having an opening; and
g) a stir stick, configured to be carried by the lid, and extendable through the opening in the lid and into the container, and to be pivotable with respect to the lid when carried thereby.

* * * * *